United States Patent Office 3,024,287
Patented Mar. 6, 1962

3,024,287
PREPARATION OF 2-SUBSTITUTED PRIMARY ALCOHOLS
Flynt Kennedy and Allan Lundeen, Ponca City, Okla., assignors to Continental Oil Company, Ponca City, Okla., a corporation of Delaware
No Drawing. Filed Mar. 19, 1959, Ser. No. 800,395
16 Claims. (Cl. 260—632)

This invention relates to the preparation of 2-substituted and 2,2-disubstituted or what may be termed neopentyl type primary alcohols and is more particularly concerned with the preparation of such by the reaction of organoaluminum compounds with 1-substituted and 1,1-disubstituted ethylene oxides.

It has been the practice heretofore in preparing alcohols from oxirane compounds (specifically ethylene oxides) to react these with Grignard reagents, alkali metal alkyls or alkaline earth metal alkyls. There is also one case where the ethylene oxide being unsaturated was reacted with a metal halide to produce an alcohol. Grignard reagents and unsaturated ethylene oxides are rather expensive compounds. The Grignard reagent though long known has remained primarily a laboratory reagent on this account. In this case a more serious disadvantage of Grignard reagents is that they usually produce a secondary alcohol with oxiranes other than ethylene oxide itself. In the case of 1-substituted ethylene oxide the product is either primary or secondary depending on the particular ethylene oxide reacted. The product then depends on the inherent properties of this reactant and nothing is presently known to alter the outcome of such a reaction except in one isolated case. The one exception to this is that it was found in reacting styrene oxides with phenylmagnesium bromide the order of addition determined whether the product alcohol was primary or secondary. Grignard reagents when reacted with 1,1-disubstituted ethylene oxides produce secondary alcohols. Alkali and alkaline earth metal alkyls form tertiary alcohols in reaction with 1,1-disubstituted ethylene oxides. None of the known methods produce primary neopentyl-type alcohols from ethylene oxides and in only some cases produce 2-substituted primary alcohols from 1-substituted ethylene oxides. The reactions involving an unsaturated ethylene oxide, necessitate hydrogenation to obtain a saturated 2-substituted alcohol, and the step of alkylation at the double bond would not yield a 2,2-disubstituted primary alcohol, but instead a branch chained substituent in the 2-position.

It is, therefore, a principal object of this invention to provide a new method of preparing 2-2-disubstituted primary alcohols. It is another object to provide a new general and reliable method of preparing 2-substituted primary alcohols. Another object is to prepare 2-substituted and 2,2-disubstituted primary alcohols in comparatively good yields and more economically. Another object of this invention is to avoid the necessity of utilizing comparatively expensive starting materials and comparatively expensive process steps such as hydrogenation. These objects and advantages in addition to others, will become apparent from the discussion hereinafter.

For simplicity, the invention may be briefly described as comprising the reaction of aliphatic organoaluminums with 1-substituted and 1,1-disubstituted ethylene oxides, hydrolyzing the reaction products whereby 2-substituted and 2,2-disubstituted primary alcohols are respectively produced.

The primary alcohols produced by the reaction have hydrocarbon radical substituents in the 2-position. This imparts highly desirous properties to these alcohols. More specifically, when said alcohols are subsequently reacted with an acid, the resultant ester has superior properties with regard to thermal and hydrolytic stability. The 2,2-disubstituted primary alcohols are markedly superior even to the 2-substituted primary alcohols in these types of stabilities and equally more difficult to prepare. The preparation of 2-substituted primary alcohols by this process is advantageous over those processes known to the art. The preparation of the 2,2-disubstituted primary alcohols by this process is yet a more marked improvement over the art. The 1- and 1,1-disubstituted ethylene oxides and the corresponding 2-substituted and 2,2-disubstituted primary alcohols then are not necessarily equivalents, as heretofore it has been necessary to prepare the 2-substituted and 2,2-disubstituted alcohols by entirely different processes.

To elaborate on the invention further it may be stated that the process comprises reacting a trialkylaluminum with 1-substituted and 1,1-disubstituted ethylene oxides at a temperature which varies in the broad range of $-70$ to $+200°$ C. and hydrolyzing the reaction products whereby a 2-substituted and 2,2-disubstituted primary alcohol, respectively, is produced.

The invention may be perhaps more concisely and more beneficially explained by the following general equations:

(1)
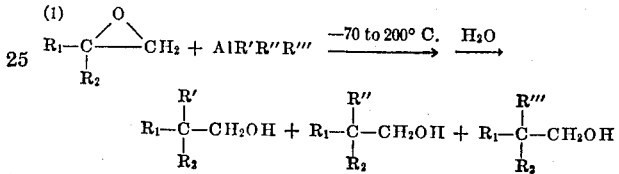

In a more narrow and accurate perspective the invention may be represented by the equations:

(2)
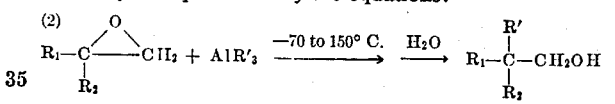

where $R_2=H$ (3)
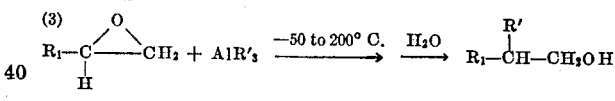

In the above equations, the suitable ethylene oxides are represented by the generic formula

and the suitable trialkylaluminums are represented by the generic formula $AlR'_3$. It should be remembered that the organic radicals of the aluminum may be different; and the formula $AlR'R''R'''$ of Equation 1 is a truer generic formula for the trialkylaluminums which will be found suitable.

Briefly, the compounds represented by the formula:

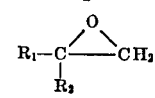

are generically 1-substituted and 1,1-disubstituted ethylene oxides. The compounds represented by the formula $AlR'R''R'''$ are organo-aluminums where one of $R'$, $R''$, and $R'''$ may be hydrogen and at least one of which is an aliphatic hydrocarbon radical of less than eight carbons, preferably 6 carbons or less. It is possible that one of these may be cyclic such as cyclohexyl and phenyl although such has not been demonstrated. $R'$, $R''$, and $R'''$ are preferably all aliphatic radicals at the same time, but these aliphatic radicals may be alike or dissimilar.

More specific representative examples of the R's are as follows:

$R'$ may be methyl, ethyl, propyl, butyl, isobutyl, pentyl, isopentyl, 3-methyl pentyl, and hexyl.

R" may be methyl, ethyl, propyl, butyl, isobutyl, pentyl, isopentyl, 3-methyl pentyl, hexyl, and heptyl.

R'" may be hydrogen, methyl, ethyl, propyl, butyl, isobutyl, pentyl, isopentyl, 3-methyl pentyl, hexyl, and heptyl.

$R_1$ may be methyl, ethyl, propyl, butyl, isobutyl, pentyl, hexyl, isohexyl, heptyl, octyl, nonyl, decyl, undecyl, dodecyl and higher aliphatic radicals, phenyl, benzyl, aromatic substituted alkyl radicals such as 2-phenylethyl, and alicyclic radicals such as methyl cyclohexyl and ethylcyclohexyl.

$R_2$ may be hydrogen, methyl, ethyl, propyl, butyl, isobutyl, pentyl, hexyl, isohexyl, heptyl, octyl, nonyl, decyl, undecyl, dodecyl and higher aliphatic radicals, phenyl, benzyl, aromatic substituted alkyl radicals such as 2-phenylethyl, and alicyclic radicals such as methyl cyclohexyl and ethylcyclohexyl.

Representative but not limiting examples of specific compounds suitable in the invention are:

Oxirane compounds as follows: propylene oxide, 1,2-epoxy butane, 1,2-epoxy pentane, 1,2-epoxy hexane, 1,2-epoxy heptane, 1,2-epoxy octane, 1,2-epoxy nonane, 1,2-epoxy decane, 1,2-epoxy undecane, 1,2-epoxy dodecane, 1,2-epoxy hexadecane, 1,2-epoxy octadecane, etc., isobutylene oxide, 2-methyl-1,2-epoxy butane, 2-ethyl-1,2-epoxy pentane, 2-methyl-1,2-epoxy hexane, 2-butyl-1,2-epoxy heptane, 2-propyl-1,2-epoxy octane, 2-butyl-1,2-epoxy nonane, 2-ethyl-1,2-epoxy undecane, 2-methyl-1,2-epoxy myristane, 2-ethyl-1,2-epoxy octadecane, styrene oxide, 2-benzyl-1,2-epoxy hexane, 2-cyclohexyl ethylene oxide, 2-(4-ethylcyclohexyl) ethylene oxide, 2-cyclohexyl-1,2-epoxy decane.

Organoaluminums as follows: diethylaluminum hydride, triethylaluminum, tripropylaluminum, tri(isobutyl)aluminum, tripentylaluminum, trihexylaluminum, triheptylaluminum, methyldiethylaluminum, ethyldibutylaluminum, dioctylethylaluminum, ethylbutylhexylaluminum, propylhexyloctylaluminum, ethyl(isobutyl)hexylaluminum, ethyloctylaluminum.

Still another method of representing the suitable substituted ethylene oxides and organoaluminums, which some may find more convenient, is by the Formulas 4 and 5:

(4)
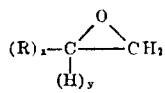
$$(R)_x-C\underset{(H)_y}{\overset{O}{\diagup\diagdown}}CH_2$$

where R represents hydrocarbon radicals as defined hereinabove, where H, of course, represents hydrogen, where $x$ is an integer varying from 1 to 2, inclusively, $y$ is an integer varying from 0 to 1, inclusively, with the condition that the sum of $x$ and $y$ must equal 2; R in the monosubstituted ethylene oxide may represent an alkyl radical of 1 through 16 carbons while the R's in the disubstituted ethylene oxide may be alkyl radicals totaling 2 through 20 carbons;

(5) $\qquad Al(R')_p(R'')_q(H)_r$ where R' represents an alkyl radical of less than 7 carbons, R" represents an alkyl radical of more than 6 carbons, H, of course, again represents hydrogen, $p$ is an integer varying from 1 to 3, inclusive, $q$ is an integer varying from 0 to 2, inclusive, and $r$ is an integer varying from 0 to 1, inclusive, with the condition that the sum of $p$, $q$ and $r$ must equal 3.

It can be readily seen that it is possible to make a mixture of primary alcohols by this invention. Such may be highly desirous upon occasion.

It is to be noted at this point that with high molecular weight alkylaluminums and highly branched alkylaluminums lower yields of the primary alcohols are realized. In light of this, the aluminum compounds preferred are those containing at the most one alkyl group greater than about 7 carbons or one highly branched alkyl radical on the aluminum atom. Aluminum compounds containing more than one alkyl group of about 6 carbons or highly branched alkyl group therein will produce the desired primary alcohols but yields will be comparatively poor. Even with only one alkyl group greater than 6 carbons or highly branched alkyl group in the organoaluminum molecule, the yields of primary alcohol in some cases begin to decrease.

Another feature of this process is that it has been found that some 2-substituted primary alcohol is produced as a by-product in the preparation of neopentyl type alcohols by straight reduction of the ethylene oxide. This may be good inasmuch as such is usually not produced as a detrimental effect of lower yields of the neopentyl type alcohols. The 2-substituted alcohols are valuable products in themselves although, as a by-product in the production of neopentyl alcohols, they occur in rather minor amounts. The 2-substituted alcohols are the prime product and the desired product when reacting a 1-substituted ethylene oxide at the appropriate conditions, therefore the occurrence of some 2-substituted primary alcohols in the preparation of neopentyl alcohols may be advantageous, if not at the expense in yield of the neopentyl alcohols. Some secondary alcohols are usually produced by the process but in minor amounts. This usually occurs with a corresponding decrease in yield of the primary alcohol, but yields of the primary alcohols in general are good. Secondary alcohols are often valuable; and unless too much sacrifice in yield of desired primary alcohol occurs, this by-product may not be objectionable, at least not in the few cases where yields of primary alcohol tend to be comparatively poor.

Although the broad general range in temperature is —70 to 200° C., a different narrower overlapping portion of the broad range must be employed in the preparation of the 2,2-disubstituted products, specifically about —70 to 150° C. In both the cases of the 2-substituted and 2,2-disubstituted products, an important critical factor to consider when using temperature above 100° C. is the decomposition temperature of the alkylaluminum. The exact decomposition temperature varies, depending on the particular organic radicals attached to the aluminum atom. These decomposition temperatures generally vary from approximately 120° C. to above 200° C. Naturally, the decomposition temperature of the particular organoaluminum compound may cause upper portions of the temperature range to be unsuitable. In many cases, these decomposition temperatures are known; in those cases where it is not, this is readily obtainable by routine tests. Because yields are generally better, temperatures not in excess of 100° will normally be used; although, in some cases as has been explained, temperatures as high as 200° C. may be employed and perhaps advantageously. Generally, for the preparation of 2-substituted products, the preferred range is 0 to 50° C., for the 2,2-disubstituted products, the preferred range is approximately —70 to 50° C. The most preferred temperature for the 2,2-disubstituted product is —40° C. to room temperature (approximately 20° C.). The most preferred range of temperature for the 2-substituted products is room temperature to 50° C. For the most part, the lower temperature range yields a greater amount of desired product; however the reaction rate slows as the temperature is lowered. Thus, in practice the preferred temperature in the operable range is based primarily on economic consideration, and therefore the most preferred ranges will vary some in individual cases. Those preferred ranges specified, however, will generally be found to be the best in light of economic considerations.

The preferred pressure to be employed is atmospheric. The process may be operable at both sub- and supra-atmospheric pressures; however, such pressures increase the cost of operation with little benefits.

It is also a preferred embodiment that the substituted ethylene oxide be added to the aluminum compound in order that better control be achieved. In contrast to some prior art processes, the products and composition of the reaction products are substantially the same regardless of the order of addition. It is not then necessary to add the substituted ethylene oxide to the aluminum compound, but such order of addition is preferred.

It will usually be found desirable to employ an inert diluent with the organoaluminum compound. Still further in some cases, it may even be desirable to have both reactants mixed individually with an inert diluent prior to the reaction. In the case of the organoaluminum compound, as a practical matter, a diluent is required. This is normally true of any reaction involving an organoaluminum compound due to its ability to oxidize readily. The diluent in effect occludes oxygen and moisture, contained in air, from the organoaluminum compound and prevents its oxidation. In this particular reaction, it also serves to aid in control so that the reaction does not proceed too rapidly. It will be appreciated by those skilled in the art that a diluent for the organoaluminum compound is preferred; however it is not absolutely required. The process may then be run without any diluent but will require cautious handling of the organoaluminum compound. (Usually an inert atmosphere such as nitrogen is employed if a solvent is not.) Saturated aliphatic hydrocarbons such as decane and aromatic hydrocarbons as benzene and O-dichlorobenzene are well known suitable solvents for organoaluminum compounds. The term inert diluent as used here means a diluent which is nonreactive with the substituted ethylene oxides, the organoaluminum compounds charged, a mixture of the substituted ethylene oxide and the organoaluminum compound and also nonreactive with the reaction products. It has been found that some solvents which are inert to both the substituted ethylene oxide and the organoaluminum are reactive with a mixture of the two. To name one solvent which exhibited this rather strange phenomena was toluene. Then a more complete definition of the suitable solvents are those which are inert to each of the reactants considered alone and further which do not readily participate in the Friedel-Crafts reaction. Those versed in the art will find this sufficient to guide them in the selection of a solvent when one is to be employed.

This invention makes possible an integrated process for preparing primary alcohols having substituents in the 2-position and of almost any weight using a minimum number of starting agents. For example, it is possible to prepare a 1-olefin from a trialkylaluminum by the displacement reaction using, for example, ethylene as the organic material displacing the radicals on the aluminum atom. Triethylaluminum is formed simultaneously with the 1-olefin. The 1-olefin is oxidized to the respective substituted epoxide compound after the displacement and the resulting epoxide may then be reacted with the triethylaluminum formed as a result of the displacement reaction according to this invention. The integrated process is even more versatile in that from a single appropriate olefin of a low molecular weight after forming the organoaluminum compound with the olefin, the length of the chain and consequently the weight of say a branched alkyl radical on the aluminum may be increased. This is done through the addition of ethylene molecules by means of the growth reaction before displacement. Such reactions as the formation of alkylaluminums, the growth reaction, and displacement are well known in the art. Their applicability to this process, however, is pointed out to show the enhanced commercial possibilities of the present invention. Naturally, the growth process is not the only suitable method here for preparing the desired alkylaluminum. Alkylaluminums prepared by other methods are also suitable.

The following more detailed illustrative examples will serve to more fully explain the invention. The invention, however, is not limited to the specific examples shown.

*Example 1*

In a 50-ml., 3-necked flask was placed 30 ml. of hexane and 5.4 ml. of triethylaluminum. A solution of 2 ml. of 1,2-epoxy-2-methylbutane in 10 ml. of hexane is added during 15 minutes at 0° C. After hydrolysis with 30 percent KOH, the mixture was analyzed by gas liquid partition chromatography. The yield of 2-methyl-2-ethyl-1-butanol was 57 mole percent.

*Example 2*

Thirteen milliliters of triethylaluminum was charged to a 50-ml., 3-necked flask. Five milliliters of 1,2-epoxy-2-methyl-butane was added during 1.7 hours while maintaining the temperature below 20° C. The reaction products were then hydrolyzed with 30 percent KOH and analyzed. The yield of 2-methyl-2-ethyl-1-butanol was 70 mole percent.

*Example 3*

To a 500-ml. flask, flushed well with nitrogen, 200 ml. of O-dichlorobenzene and 48 ml. of triethylaluminum was charged. 20 ml. of propylene oxide was added over 20 minutes, while the temperature was maintained between 35 and 40° C. The reaction products stood for approximately 65 hours and then hydrolyzed in 300 ml. of 30 percent HCl. The reaction products were distilled, and the fraction boiling at 126–8° C. ($n_D25$ 1.4104) was identified as 2-methyl-1-butanol which was obtained in a 71 mole percent yield.

*Example 4*

In a 50-ml., 3-necked flask was placed 6.44 grams of toluene and 7.9 ml. of tri(isobutyl)aluminum. A solution of 1.205 grams of isobutylene oxide in 6.44 grams of toluene was added at −30° C. over 10 minutes. The mixture was hydrolyzed in 0.5 volumes of 30 percent HCl saturated with NaCl. The yield of 2,2,4-trimethyl pentanol by gas phase chromatography was 7.6 percent.

*Example 5*

To a solution of 0.5 ml. of trihexylaluminum in 1 ml. of benzene was added 0.1 ml. of 1,2-epoxy-2-methylbutane. After standing 16 hours, the mixture was hydrolyzed with 1 ml. of 30 percent HCl.

*Example 6*

Ethyl di-n-octylaluminum was prepared from 0.2 moles of trioctylaluminum and 0.1 mole of triethylaluminum by warming to 100° C. for one hour. To 4.3 ml. of this preparation was added 0.75 ml. 1,2-epoxy-2-methyl butane at ambient temperature. After 5 hrs. the mixture was hydrolyzed and analyzed by gas chromatography which indicated the yield of 2-methyl-2-ethyl-1-butanol was 10 percent. No $C_{12}$ was detected.

*Example 7*

Isobutylene oxide (0.02 m.) was added to triethylaluminum (0.04 m.) in an inert atmosphere at ambient temperature. After hydrolysis an analysis indicated the yield of 2,2-dimethyl-1-butanol to be 60 percent.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. The process of preparing primary alcohols substituted in the 2-position which comprises the steps of, reacting a substituted ethylene oxide and an organoaluminum compound, then hydrolyzing the reaction product, and wherein said ethylene oxide has the formula:

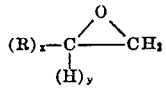

in which R is a hydrocarbon radical and $x$ is an integer varying from 1 to 2, $y$ is an integer varying from 0 to 1 with the further provision that the sum of $x$ and $y$ equals 2; and wherein said organoaluminum compound has the formula:

$$Al(R')_p(R'')_q(H)_r$$

in which R' represents an alkyl radical of less than 8 carbons, R'' represents an alkyl radical of more than 6 carbons, $p$ is an integer varying from 1 to 3, $q$ is an integer varying from 0 to 2 and $r$ is an integer varying from 0 to 1 with the further provision that the sum of $p$, $q$, and $r$ is equal to 3.

2. The process of preparing 2-substituted primary alcohols which comprises the steps of reacting a monosubstituted ethylene oxide and an organoaluminum compound, then hydrolyzing the reaction products; and wherein said ethylene oxide has the formula:

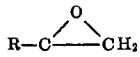

in which R represents a hydrocarbon radical, and wherein said organoaluminum compound has the formula:

$$Al(R')_3$$

in which R' represents an alkyl radical of not more than 6 carbons.

3. A process according to claim 2 characterized further in that the monosubstituted ethylene oxide and the trialkylaluminum are reacted at a temperature varying in the range of −50 to 200° C.

4. A process according to claim 3 wherein the reaction temperature varies in the range of 0 to 50° C.

5. A process according to claim 3 wherein R in the monosubstituted ethylene oxide represents an alkyl radical of 1 through 16 carbons.

6. A process according to claim 5 wherein the aluminum compound is triethyl aluminum.

7. A process according to claim 3 wherein the monosubstituted ethylene oxide is propylene oxide.

8. A process according to claim 3 wherein the monosubstituted ethylene oxide is 1,2-epoxyhexane.

9. A process according to claim 3 wherein the monosubstituted ethylene oxide is 1,2-epoxyoctane.

10. The process of preparing neopentyl type primary alcohols which comprises the steps of reacting a disubstituted ethylene oxide and an organoaluminum compound, then hydrolyzing the reaction products; and wherein said ethylene oxide has the formula:

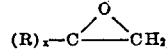

in which R represents hydrocarbon radicals which may be alike and $x$ equals 2; and wherein said organoaluminum compound has the formula:

$$Al(R')_3$$

in which R' represents an alkyl radical of not more than 6 carbons.

11. A process according to claim 10 characterized further in that the disubstituted ethylene oxide and the trialkylaluminum are reacted at a temperature varying in the range of −70 to 150° C.

12. A process according to claim 11 wherein the reaction temperature varies in the range of −40 to room temperature.

13. A process according to claim 11 wherein the R's in the disubstituted ethylene oxide are alkyl radicals totaling 2 through 20 carbons.

14. A process according to claim 11 wherein the disubstituted ethylene oxide is isobutylene oxide.

15. A process according to claim 11 wherein the disubstituted ethylene oxide is 1,2-epoxy-2-methylpentane.

16. The process according to claim 11 wherein the aluminum compound is triethylaluminum.

References Cited in the file of this patent

UNITED STATES PATENTS

| | | |
|---|---|---|
| 2,106,182 | Kreimeier | Jan. 25, 1938 |
| 2,873,297 | Ramsden | Feb. 10, 1959 |

UNITED STATES PATENT OFFICE
CERTIFICATE OF CORRECTION

Patent No. 3,024,287　　　　　　　　　　　　　　　　March 6, 1962

Flynt Kennedy et al.

It is hereby certified that error appears in the above numbered patent requiring correction and that the said Letters Patent should read as corrected below.

Column 7, lines 25 to 27, the formula should appear as shown below instead of as in the patent:

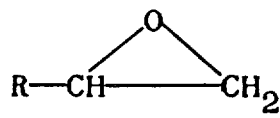

Signed and sealed this 17th day of July 1962.

(SEAL)
Attest:

ERNEST W. SWIDER　　　　　　　　　　　　　　　　DAVID L. LADD
Attesting Officer　　　　　　　　　　　　　　　　Commissioner of Patents